(12) United States Patent
Ishikawa et al.

(10) Patent No.: US 8,714,827 B2
(45) Date of Patent: May 6, 2014

(54) BEARING FOR TRANSMISSION

(75) Inventors: Yasumitsu Ishikawa, Iwata (JP);
Tomokazu Nakagawa, Iwata (JP);
Katsuaki Sasaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/138,954

(22) PCT Filed: May 10, 2010

(86) PCT No.: PCT/JP2010/057870
§ 371 (c)(1),
(2), (4) Date: Nov. 1, 2011

(87) PCT Pub. No.: WO2010/131619
PCT Pub. Date: Nov. 18, 2010

(65) Prior Publication Data
US 2012/0051680 A1    Mar. 1, 2012

(30) Foreign Application Priority Data

May 14, 2009  (JP) ................................. 2009-117402
Dec. 9, 2009   (JP) ................................. 2009-279254
Apr. 21, 2010  (JP) ................................. 2010-097841

(51) Int. Cl.
*F16C 33/38*      (2006.01)
*F16C 33/80*      (2006.01)

(52) U.S. Cl.
USPC .......................................... 384/480; 384/530

(58) Field of Classification Search
USPC ......... 384/462, 470, 523, 528, 530, 486, 477, 384/478
See application file for complete search history.

(56) References Cited

U.S. PATENT DOCUMENTS

| 4,958,946 A | * | 9/1990 | Voll ............................... 384/523 |
| 5,044,783 A | * | 9/1991 | Willner ........................ 384/523 |
| 5,840,666 A |   | 11/1998 | Yokouchi et al. |
| 6,010,248 A | * | 1/2000 | Ueno et al. ..................... 384/527 |

(Continued)

FOREIGN PATENT DOCUMENTS

CN    1379191 A    11/2002
CN    1918269 A    2/2007

(Continued)

OTHER PUBLICATIONS

International Search Report for PCT/JP2010/057870 mailed Aug. 10, 2010.

(Continued)

*Primary Examiner* — Phillip A Johnson

(57) ABSTRACT

A bearing assembly for a transmission, which is capable of avoiding an ingress of foreign matter, reducing seal torque and reducing shear resistance between a retainer and balls, includes a recessed portion in an inner face of a pocket of the retainer, in which the surface area of contact with a ball is smaller than the surface area of contact when no recessed portion is provided. A sealing member is a contact seal and material of a tip portion of a sealing lip region is highly wearable material which, when the bearing assembly is rotated, wears to define a non-contact or the like. A grease contains a base oil and a thickening agent and the base oil is a mineral oil alone or a mixed oil of mineral oil and poly-α-olefin oil and has base oil kinetic viscosity not higher than 100 mm²/s at 40° C.

11 Claims, 8 Drawing Sheets

(56) References Cited

U.S. PATENT DOCUMENTS

| | | | |
|---|---|---|---|
| 6,682,223 B2 * | 1/2004 | Sugimori et al. | 384/462 |
| 6,790,297 B1 | 9/2004 | Ueda et al. | |
| 8,003,582 B2 | 8/2011 | Mikami | |
| 8,317,404 B2 | 11/2012 | Sato et al. | |
| 2003/0077015 A1 | 4/2003 | Sugimori et al. | |
| 2005/0152628 A1 * | 7/2005 | Egami et al. | 384/462 |
| 2007/0154128 A1 | 7/2007 | Mikami | |
| 2008/0166080 A1 * | 7/2008 | Kawamura | 384/462 |
| 2010/0098366 A1 | 4/2010 | Sato et al. | |

FOREIGN PATENT DOCUMENTS

| | | |
|---|---|---|
| EP | 0 810 381 | 5/1997 |
| EP | 1 083 350 | 9/2000 |
| JP | 46-3130 | 2/1971 |
| JP | 46-34244 | 11/1971 |
| JP | 2001-146922 | 5/2001 |
| JP | 2003-13962 | 1/2003 |
| JP | 2003-287040 | 10/2003 |
| JP | 2003-292981 | 10/2003 |
| JP | 2006-342901 | 12/2006 |
| JP | 2007-107588 | 4/2007 |
| JP | 2007-292195 | 11/2007 |
| JP | 2008-208994 | 9/2008 |
| JP | 2008-240796 | 10/2008 |

OTHER PUBLICATIONS

International Preliminary Report on Patentability mailed Dec. 22, 2011 issued in corresponding International Patent Application No. PCT/JP2010/057870.

Chinese Office Action issued May 6, 2013 in corresponding Chinese Patent Application No. 201080020964.2.

Extended European Search Report issued Sep. 20, 2013 in corresponding European Application No. 10 77 4876.

Chinese Office Action issued Nov. 13, 2013 in corresponding Chinese Patent Application No. 201080020964.2.

Notification of Rejection issued Nov. 19, 2013 in corresponding Japanese Patent Application No. 2010-097841.

* cited by examiner

BEARING FOR TRANSMISSION

CROSS REFERENCE TO THE RELATED APPLICATIONS

This application claims the benefit under 35 U.S.C. Section 371, of PCT International Application No. PCT/JP2010/057870, filed May 10, 2010, which claimed priority to Japanese patent application No. 2009-117402, filed May 14, 2009, Japanese patent application No. 2009-279254, filed Dec. 9, 2009, and Japanese patent application No. 2010-097841, filed Apr. 21, 2010, the entire disclosures of all of which are herein incorporated by reference as a part of this application.

BACKGROUND OF THE INVENTION

1. Field of the Invention

The present invention relates to a bearing for a transmission for use on a drive shaft of a gearing device of a kind employed in, for example, an automobile transmission and, more particularly, to a technique that makes it possible to avoid an undesirable ingress of foreign matter into the bearing assembly, to reduce the seal torque and to reduce the shear resistance of an oil between a retainer and balls.

2. Description of Related Art

The ball retainer generally employed in the conventional ball bearings has a plurality of ball bearing pockets each being of a shape having a single curvature following the shape of each ball. Also, in order to enhance a lubricating condition, a ball retainer of a shape, in which each ball bearing pocket is depressed, is applied for patent. (See the patent documents 1 and 2 listed below.)

To avoid an undesirable ingress of foreign matter into the bearing assembly for a transmission, a contact type seal capable of sealing a bearing space is available. In such case, although a possible ingress of foreign matter can be avoided satisfactorily, a problem remains unsolved as to how the mechanical loss is reduced in order to pursue an increased mileage of an automotive vehicle. According to the related art, a technique of reducing the contact resistance at a sealing lip portion has been suggested to achieve a reduction of the mechanical loss. For example, shot peening is applied a contact type sealing lip slide surface to render the maximum roughness of the slide surface to be not greater than 2.5 µm so that the sealing torque can be reduced. (See the patent document 3 listed below.)

PRIOR ART DOCUMENTS

[Patent Document 1] JP Laid-open Patent Publication No. 2003-13962
[Patent Document 2] JP Laid-open Patent Publication No. 2006-342901
[Patent Document 3] JP Laid-open Patent Publication No. 2007-107588

SUMMARY OF THE INVENTION

[Regarding the Ball Retainer]

The bearing assembly for use in the automotive vehicle is currently encountered with a demand to reduce the torque in the face of an environment related issue including, for example, an increase of mileage. Of various bearing torques, the torque generated between the ball retainer and the steel balls involves a substantial proportion of the shear resistances. Most of those shear resistances occur when the oil film, which is formed between an inner side of each of the pockets and the corresponding steel ball accommodated within such pocket, is sheared.

In the case of the ball retainer of a type having the pockets each so formed as to have the single curvature following the steel ball shape, a lubricant is apt to flow through a minute gap delimited between each of the steel ball and the inner side of the respective retainer pocket then enclosing such steel ball. For this reason, a resistance is induced, thus constituting a cause of an undesirable increase of the torque.

[Regarding the Sealing]

For the purpose of avoiding the undesirable ingress of the foreign matter into the bearing assembly for a transmission, a seal equipped bearing assembly is applied. Since this seal has a seal allowance and a seal slide surface of an inner ring, the slide resistance of the seal tends to be generated, thus constituting a cause of the undesirable increase of the torque.

An object of the present invention is to provide a bearing assembly for a transmission, which is capable of avoiding an undesirable ingress of foreign matter into the bearing space, reducing the seal torque and reducing the shear resistance occurring between the ball retainer and the balls.

In order to accomplish the foregoing object, the bearing assembly for a transmission designed in accordance with the present invention is a bearing assembly adapted to be arranged in a transmission for transmitting a rotation of an input shaft to an output shaft, which bearing assembly includes a plurality of balls interposed between first and second raceways defined respectively in first and second raceway rings, a retainer for retaining those balls, and a sealing member for sealing a bearing space delimited between the first and second raceway rings with a grease filled in such bearing space; in which the retainer is formed with a plurality of pockets for retaining the respective balls, each of the pockets being defined by semicircular bulged portions opposed to each other and has an inner face formed with a recessed portion extending from a retainer inner diametric side to a retainer outer diametric side; in which the sealing member is in the form of a contact seal including first and second end portions opposite to each other, the first end portion of the sealing member being fixed to one of the first and second raceway rings whereas the second end portion has a sealing lip region that is adapted to contact the other of the first and second raceway, a material for at least a tip portion of the sealing lip region being a highly frictionally wearable material which wears, when the bearing assembly is used in a rotating condition, to form a non-contact or a light contact of a contact pressure substantially equal to zero; and in which the grease contains at least a base oil and a thickening agent, the base oil being a mineral oil alone or a mixed oil of mineral oil and poly-α-olefin oil and has a base oil kinetic viscosity at 40° C., which is not higher than 100 mm$^2$/s.

The term "highly frictionally wearable material" referred to above and hereinafter is intended to mean a material susceptible to frictional wear.

According to the above described construction, since the inner face of the pocket of the retainer is provided with the recessed portions, the torque can be sufficiently reduced. The provision of the retainer of the type, in which the recessed portion is provided in the inner face of the pocket and the non-contact area, where no ball contacts, is provided therein, is effective to reduce the resistance at the time of flow of a lubricant within the pocket. The provision of the recessed portion referred to above is effective to minimize the amount of an oil film formed between the ball and the pocket.

Since the highly frictionally wearable material is used as a material for at least the tip portion of the sealing lip region of the sealing member, the sealing member, which was a contact type at the initial running stage, transforms into a non-contact or light contact type. Thus, the sealing member forms a minute labyrinth gap by frictionally wearing the tip portion of the sealing lip region then contacting. Since this labyrinth gap is smaller than the foreign matter, the lubricant oil can flow therethrough, but the foreign matter having a particle size greater enough to affect the bearing lifetime cannot flow therethrough. Also, since the grease contains at least the base oil and the thickening agent, which base oil is chosen in the form of a mineral oil alone or a mixed oil of mineral oil and poly-α-olefin oil and has a base oil kinetic viscosity not higher than 100 mm$^2$/s at 40° C., an undesirable ingress of the foreign matter such as, for example, frictionally worn particles of gears and/or burrs of a housing can be avoided and the drag resistance of the sealing member can be suppressed to a minimal value and, thus, reduction of the torque and increase of the lifetime can be concurrently accomplished.

Defining a surface area of contact between an inner face of each pocket of the retainer, with no recessed portion defined therein, and the corresponding ball as a standard contact surface area, the surface area of contact between the inner face of the respective pocket of the retainer and the ball may be reduced by a quantity equal to 15 to 30% of the standard contact surface area The low torque effect can be obtained when the lowermost limit of the contact surface area is chosen to be 15% and, on the other hand, when the uppermost limit of the contact surface area is chosen to be 30%, not only can the rigidity strength of the retainer be obtained, but also the ball can be retained.

When the non-contact area, where in the pocket inner face no ball contacts, is too small, the amount of reduction of the amount of the oil film to be sheared is small and the amount of the oil film required to reduce the torque will become too small, failing a smooth rolling of the ball. By setting the range of the surface area of contact of the ball in the associated pocket such as accomplished in the present invention, the resistance at the time of flow of the lubricant within the pocket and reduction of the amount of the oil film sheared can be accomplished concurrently.

Where the recessed portion of the retainer is arranged on the bearing outer diametric side of the pitch circle of the balls, the shearing resistance at the position at which the peripheral velocity is high can be reduced and the torque reduction can be stably achieved.

The pocket of the retainer may have a throughhole defined therein so as to extend from the retainer inner diametric side to the retainer outer diametric side, in which case the throughhole defines the recessed portion in the respective pocket. In this case, the dimension of the retainer in the axial direction of the bearing assembly does not increase and compactization thereof can be attained. In other words, while securing the dimension comparable with the standard retainer, the torque reduction can be attained. Also, the throughhole can be formed by means of a post-processing when a mold assembly for the retainer having no recessed portion provided therein is used. Not only can the equipment cost be reduced in view of the capability of the mold concurrently used, the position, size and shape of the throughhole can be simply modified as required or desired. It is to be noted that there is the opportunity that the mold is not used concurrently.

Where the retainer of the type referred to above is applied in the form of a metal retainer shaped by means of a press work, the tact time can be reduced and a mass-production can be accomplished, accompanying a reduction in cost of manufacture as compared with that afforded by a metal retainer molded by means of a cutting process.

The retainer may have incorporated therein a metal retainer shaped by means of a casting technique.

The retainer may have incorporated therein a metal retainer molded by means of a cutting technique.

The retainer may have incorporated therein a resin retainer molded by means of a cutting technique.

Where the retainer has incorporated therein the resin retainer molded by means of an injection molding technique, the weight can be reduced as compared with the metal retainer of the same shape and, therefore, the cost incurred in procuring the material can be reduced.

The tip portion of the sealing lip region may have such a sectional shape as to represent an outwardly converging shape having a greater rate of convergence than that of an intermediate portion of such sealing lip region. In this case, by causing the sealing lip region to contact a sealing lip slide portion of the second raceway ring, the surface pressure of the tip portion of the sealing lip region increases. Accordingly, the tip portion of the sealing lip portion becomes susceptible to frictionally wear. Therefore, regardless of influences brought about by the lubricant oil and the condition of the seal slide face, the following effects can be obtained.

(1) The seal torque can be quickly reduced.
(2) As compared with the conventional counterpart, self-increase of the temperature of the bearing assembly is quickly lowered.
(3) Since the self-increase of the temperature of the bearing assembly is quickly lowered, selection can be made of a lubricant oil of a viscosity that is further lower than that of the lubricant oil hitherto utilized.
(4) Reduction of a loss of the transmission in its entirety can be expected.
(5) The lubricant oil can be quickly supplied into the bearing assembly.

The bearing assembly for a transmission may be a rolling bearing for use on a drive shaft of a gearing device of an automobile transmission. In such case, the foreign matter such as, for example, the undesirable ingress of the frictionally worn particles of gears within the transmission can be avoided. Since the seal torque can be reduced, the mileage of an automotive vehicle can be increased.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1:
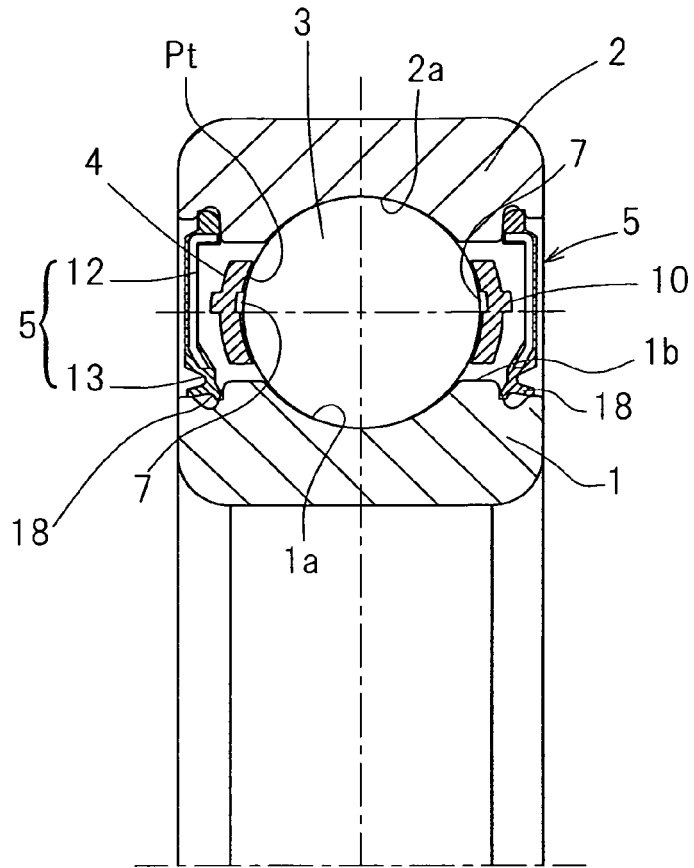
FIG. 1 is a sectional view showing a bearing assembly for a transmission designed in accordance with a first embodiment.

A bearing assembly for a transmission designed according to a first embodiment will be described in detail with particular reference to FIG. 1 to FIGS. 6A and 6B. The bearing assembly for a transmission according to this embodiment shown therein is a rolling bearing assembly that is used in an automobile transmission and includes, as shown in FIG. 1, inner and outer rings 1 and 2, which are respective raceway rings and which have respective raceways 1a and 2a defined therein, and a plurality of rolling elements 3 interposed between the raceways 1a and 2a. The inner and outer rings 1 and 2 and the rolling elements 3 are all made of a high-carbon chromium bearing steel such as, for example, SUJ2 or a stainless steel or the like of the martensite system. It is, however, to be noted that material for the inner and outer rings 1 and 2 and the rolling elements 3 is not necessarily limited to that described above. The use is made of a retainer 4 for retaining those rolling elements 3 and, also, of respective sealing members 5 for sealing opposite annular open ends of an annular bearing space delimited between the inner and outer rings 1 and 2. A grease is initially filled within this bearing assembly. The rolling bearing assembly referred to above is a deep groove ball bearing in which the rolling elements 3 are employed in the form of balls and, in the instance as shown, the bearing assembly is of an inner ring rotating type in which the inner ring 1 is a rotating ring and the outer ring 2 is a stationary ring. It is, however, to be noted that as a seal equipped bearing assembly, an angular ball bearing may be applied. Also, the bearing assembly may be of an outer ring rotating type in which the inner ring 1 is a stationary ring and the outer ring 2 is a rotating ring.

The details of the retainer 4 will now be discussed.

Figure 2:
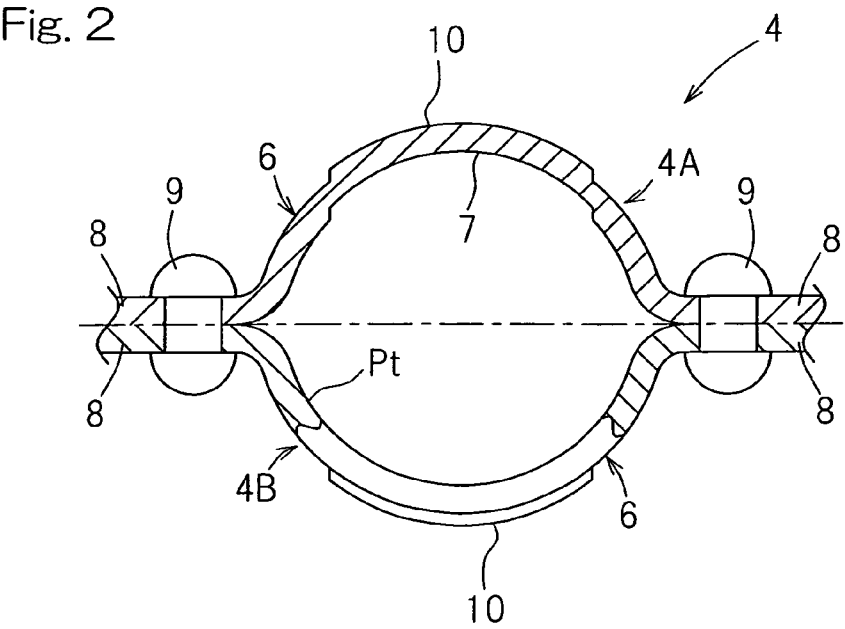
FIG. 2 is a sectional view showing an important portion of a ball retainer for the bearing assembly for a transmission shown in FIG. 1.
Figure 3A:
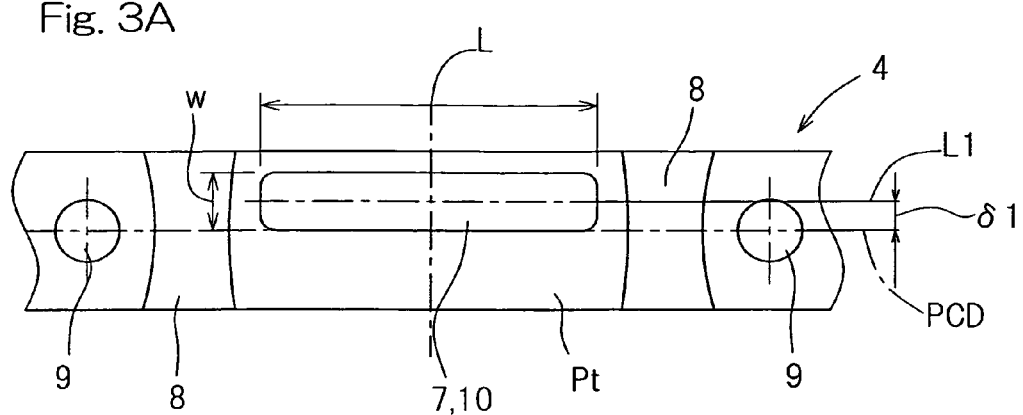
FIG. 3A is a front elevational view showing, on an enlarged scale, one of a plurality of ball bearing pockets defined in the ball retainer shown in FIG. 2.

Referring to FIGS. 2 and 3A, the retainer 4 has a plurality of pockets Pt each defined therein by opposed semicircular bulged portions 6 and 6 for holding one of a corresponding number of balls. Each of the pockets Pt has an inner face formed with a generally or substantially rectangular recessed portion 7 recessed radially outwardly from a retainer inner diametric side towards a retainer outer diametric side to such an extent that the surface area of contact between the inner face of the pocket Pt and the corresponding ball can be reduced down by a quantity equal to 15 to 30% of the conventional contact surface area exhibited between the inner face of the pocket and the corresponding ball with no recessed portion 7 formed in such inner face. In other words, defining a standard contact surface area as the surface area of contact between the inner face of the pocket Pt and the corresponding ball in the retainer having no recessed portion 7, the presence of the recessed portion 7 is made to reduce the surface area of contact between the inner face of the pocket Pt in the retainer 4 by a quantity equal to 15 to 30% of the standard contact surface area.

Selection of 15% as the lowermost limit of the above discussed range of reduction ratio of the contact surface area in the retainer 4 designed in accordance with this embodiment is effective to provide a low torque effect and, on the other hand, selection of 30% as the uppermost limit of the above discussed range of reduction ratio of the contact surface area in the retainer 4 according to this embodiment is effective to secure the rigidity strength of the retainer and also to allow the corresponding ball to be retained in position. If the uppermost limit of the range of reduction ratio of the contact surface area referred to above exceeds 30%, neither is the rigidity strength of the retainer available nor the ball be retained.

The retainer 4 of the type referred to above is comprised of two annular retainer strips 4A and 4B combined together, each of which retainer strips 4A and 4B has respective semicircular bulged portions 6 positioned in a direction circumferentially thereof in a fashion having been spaced equidistantly from each other. Each of those annular retainer strips 4A and 4B is prepared from a cold rolled hoop steel by the use of any known press work and includes the circumferentially arranged semicircular bulged portions 6 and a flat portion 8 intervening between the neighboring semicircular bulged portions 6. In a condition with the annular retainer strips 4A and 4B combined together, the flat portions 8 of one 4A of the annular retainer strips 4A and the flat portions 8 of the other 4B of the annular retainer strips are rigidly connected together by means of connecting elements 9 such as for example, rivets. It is, however, to be noted that the use of the connecting elements 9 may be dispensed with and, in such case, the flat portions 8 of one 4A of the annular retainer strips 4A and the flat portions 8 of the other 4B of the annular retainer strips have to be provided with engaging elements such as, for example, claws and to-be-engaged elements, respectively, which are engageable with each other. In those assembled condition, the semicircular bulged portions 6 in one 4A of the annular retainer strips 4A and the semicircular bulged portion 6 in the other 4B of the annular retainer strips are opposed to each other, with the ring shaped pockets Pt defined therebetween.

Figure 3B:
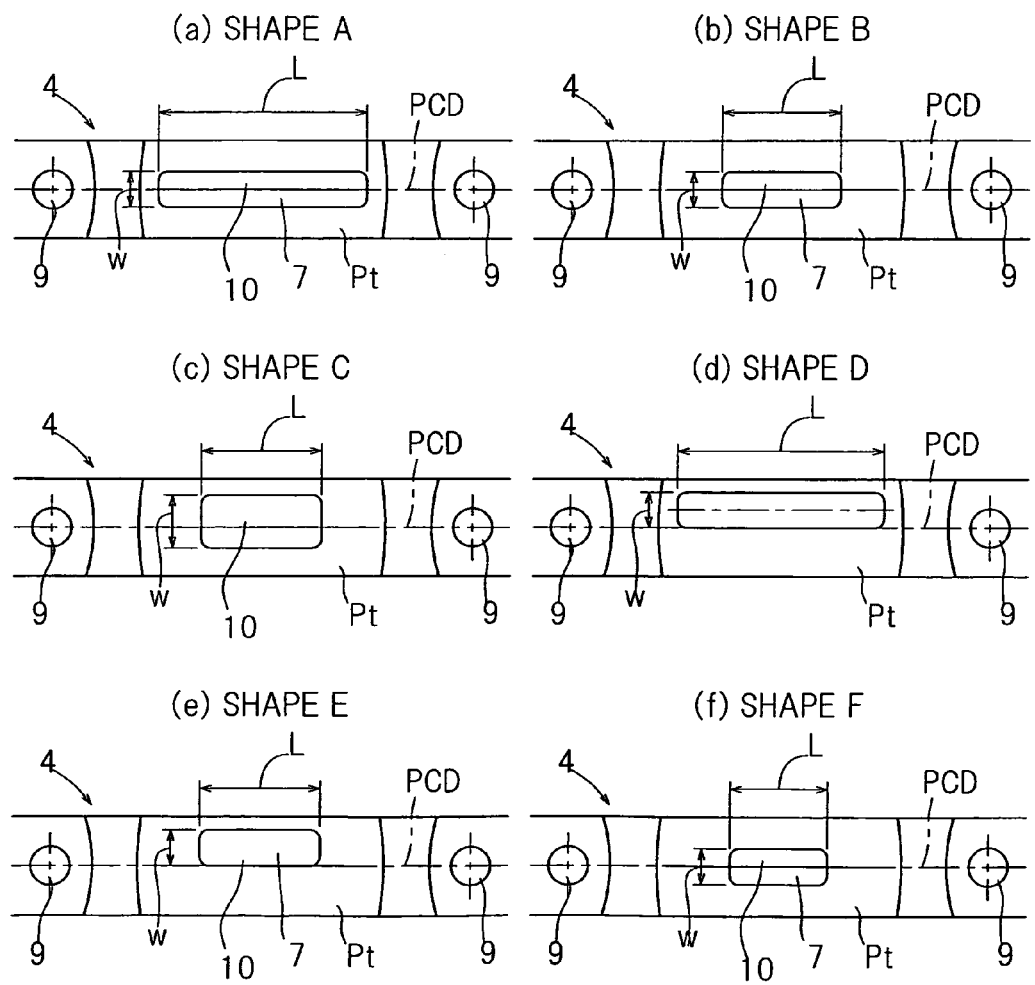
FIG. 3B is a schematic diagram showing various modifications of the ball bearing pocket shown in the ball retainer shown in FIG. 2.

In the retainer 4 so assembled in the manner described above, counter-ball facing surface areas, that is, radially outer surface areas of the semicircular bulged portions 6 are formed with respective projections 10 so as to protrude in a direction radially outwardly of the retainer 4. Thereby, ball facing surface areas of the pockets Pt are provided with the generally or substantially rectangular recessed portions 7 that are inwardly depressed towards counter-ball facing surface areas of the pockets Pt. Each of the projections 10 referred to above is rendered to have a circumferential length L of, for example, 9.0 mm, a widthwise dimension W of, for example, 1.6 mm (Shape A), a circumferential length L of, for example, 5.5 mm and a widthwise dimension W of, for example, 1.6 mm (Shape B) and so on as shown in FIG. 3B and Table 1 below. Referring to the Table 1, let it be assumed that the surface area of contact between the inner face of the pocket Pt and the corresponding ball in the retainer having no recessed portion defined therein, that is, the standard contact surface area is 100% and the retainer having the standard contact surface area of 100% is referred to as a "standard product". It is, however, to be noted that the circumferential length L and the widthwise dimension W are not necessarily limited to those values. Also, it may occur that in the retainer in this example, the center line L1 of each of the projections 10 may be set having been displaced a distance M from the pitch circle PCD, depicted by the row of the balls, in a direction radially outwardly of the bearing assembly (See Shapes D and E.). The distance δ1 may be chosen to be, for example, 0.8 mm, noting that the distance δ1 may not necessarily be limited to 0.8 mm.

TABLE 1

|  | Size of Projection (w × L) | Contact Surface Area (%) in Steel Retainer | Rate of Reduction of Torque (%) |
|---|---|---|---|
| Standard Product | — | 100 | — |
| Shape A | 1.6 × 9.0 | 70 | 59 |
| Shape B | 1.6 × 5.5 | 83 | 52 |
| Shape C | 2.6 × 5.5 | 70 | 59 |
| Shape D | *1 | 70 | 62 |
| Shape E | *2 | 83 | 54 |
| Shape F | 1.6 × 4.8 | 85 | 50 |

*1) Product in which the position of Shape A is displaced a distance of 0.8 mm from the PCD in the radially outward direction.
*2) Product in which the position of Shape B is displaced a distance of 0.8 mm from the PCD in the radially outward direction.

The result of torque measurement with each of the retainers will now be discussed.

For measurement conditions, the measurement was carried out at a radial load of 500 N, a rotational speed of 4,000 r/min. and a bearing temperature of 30° C. and ATF was used for a lubricant oil. The bearing assemblies tested was of a type having an outer ring 2 of 72.0 mm in outer diameter, an inner ring 1 of 35.0 mm in inner diameter and utilizing rolling elements (steel balls) 3 of 11.1 mm in diameter.

As a result, as compared with the rotating torque of 0.058 N·m exhibited by the standard retainer, the retainer according to this embodiment, in which the projections 10 are employed, has exhibited the rotating torque of 0.044 N·m. Accordingly, an effect of reducing the torque in a quantity of about 24% of that exhibited by the standard ball bearing could have been ascertained.

Figure 4:
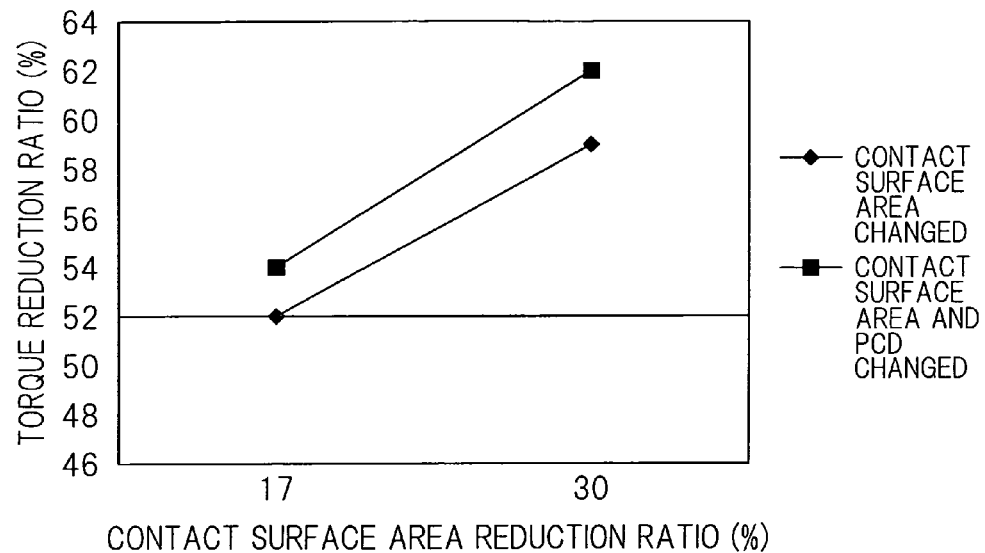
FIG. 4 is a diagram showing the relation between the contact surface area reduction rate and the torque reduction rate.

Also, of the retainers designed according to this embodiment of the present invention, in which each of the semicircular bulged portion 6 is provided with the respective projection 10, as shown in FIG. 3B and Table 1 below, the chart illustrating the change in torque exhibited by instances, in which the surface area of contact between the pocket inner face of the retainer and the corresponding ball has been changed to various values, and instances in which the center line L1 (FIG. 3A) of each of the projections 10 has been displaced radially outwardly from the pitch circle PCD, is shown in FIG. 4.

As shown in FIG. 4 and Table 1 below, when the surface area of contact between the inner face of each of the pockets Pt in the retainer 4 was reduced by 15% of the standard contact surface area in the standard product, the torque could have been reduced by a quantity of about 50%. Also, when not only was the contact surface area was reduced by a quantity equal to 30% of the standard contact surface area, but also the center line L1 of the projection 10 displaced a distance of 0.8 mm radially outwardly from the pitch circle PCD, the torque could have been reduced by a quantity of about 60%.

Hereinafter, the sealing members 5 will be discussed in detail.

Figure 5:
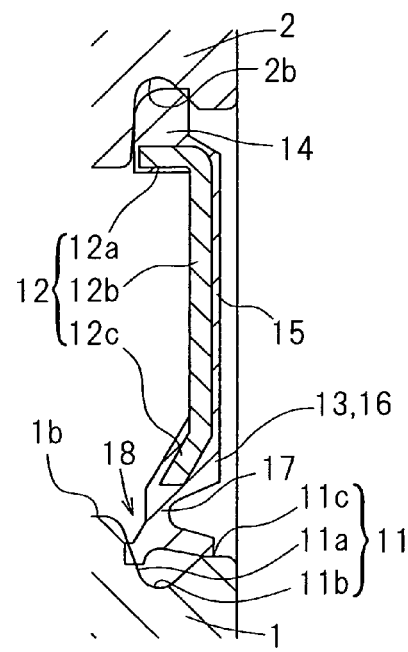
FIG. 5 is a sectional view showing an important portion of a sealing member employed in the bearing assembly for a transmission shown in FIG. 1.

Referring to FIGS. 1 and 5, the outer ring 2 has an inner peripheral surface formed with seal mounting grooves 2b each used to accommodate the corresponding sealing member 5. On the other hand, the inner ring 1 is formed with a seal groove 11 in the form of circumferentially extending groove defined at a location radially aligned with an inner diametric portion of the sealing member 5. Each of the seal grooves 11 in the inner ring 1 is made up of an inner side wall face, that is, inner face 11a continued to an inner ring outer diametric surface 1b, a groove bottom face 11b continued to the inner face 11a, and an outer peripheral face 11c continued from the groove bottom face 11b and smaller in diameter than the inner ring outer diametric surface 1b.

The inner face 11a in the inner ring 1 is of a shape substantially flat and somewhat inclined at an axially outer side (at a right side as viewed in FIG. 5) from an outer diametric side towards an inner diametric side. A sealing lip region as will be described later contacts this inner face 11a in an axial direction. An upward inclined shape is formed, which extends from the groove bottom face 11b towards the outer peripheral face 11c and the sealing lip region contacts this outer peripheral face 11c in a radial direction.

Each of the sealing members 5 is made up of an annular core metal 12 and an elastic member 13 bonded integrally to this core metal 12. Each sealing member 5 as a whole is molded to an intended shape by vulcanization of a rubber material and the core metal 12 is then bonded to the elastic member 13 during the vulcanization.

The core metal 12 is made up of a cylindrical wall 12a, a radial upright wall 12b and an inclined wall 12c, which are arranged sequentially in this order from the outer diametric side. The upright wall 12b is disposed at an axial inner side of the bearing assembly inwardly of an end face of any of the inner and outer rings 1 and 2 in a fashion substantially parallel to the same end face. The cylindrical wall 12a is continued from a base end of the radial upright wall 12b, and this radial upright wall 12b and the cylindrical wall 12a cooperate with each other to render the assembly to represent an L-sectioned configuration. An annular portion 14 of the elastic member 13 provided mainly on an outer peripheral surface of the cylindrical wall 12a is fixedly engaged in the corresponding seal mounting groove 2b in the outer ring 2. The radial upright wall 12b has a tip continued to an inclined portion 12c which is somewhat inclined axially inwardly towards an inner diametric side.

The radial upright wall 12b of the core metal 12 has an outer surface covered with a uniformly thin walled covering 15. This covering 15 forms a part of the elastic member 13. The inclined wall 12c of the core metal 12 is provided with a inclined covering 16 of a wall thickness greater than that of the covering 15. This inclined covering 16 also forms a part of the elastic member 13 and covers inner and outer surfaces of the inclined wall 12c.

A portion of the inclined covering 16, which covers an inner surface of the inclined wall 12c, is somewhat inclined in an axially inward direction as it goes towards the inner diametric side along the inner surface of thereof. On the other hand, a portion of the inclined covering 16, which covers an outer surface of the inclined wall 12c, is continued in flush with the covering 15 with no step formed therein. An inner diametric side tip of the inclined covering 16 is provided with the sealing lip region 18, through a connecting portion 17. The connecting portion 17 and the sealing lip region 18 also form respective parts of the elastic member 13.

Figure 6A:
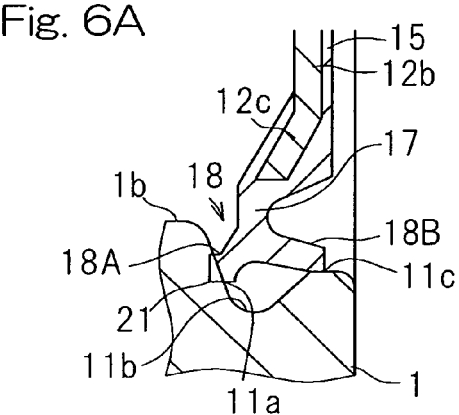
FIG. 6A is a sectional view showing, on an enlarged scale, the sealing member of FIG. 5 in a condition with a sealing lip thereof held in sliding contact with a seal groove in an inner ring.
Figure 6B:
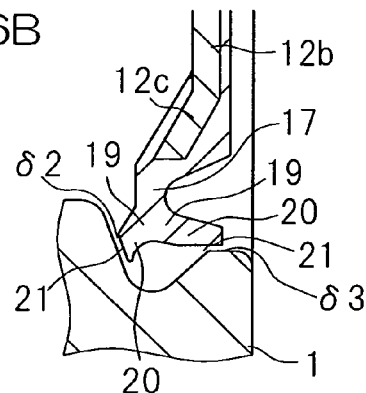
FIG. 6B is a sectional view showing, on an enlarged scale, the sealing member of FIG. 5 in a condition with the tip of the sealing lip thereof frictionally worn incident to rotation of the bearing assembly.

As shown in FIG. 5 and FIGS. 6A and 6B, the elastic member 13 includes the covering 15, the inclined covering 16, the connecting portion 17 and the sealing lip region 18. The sealing lip region 18 is made up of an inner sealing lip 18A axially inwardly inclined towards the inner diametric side, and an outer sealing lip 18B inclined towards the axially outward side. The radially inner sealing lip 18A has a tip portion held in contact with the inner face 11a in the axial direction. On the other hand, the radially outer sealing lip 18B has a tip portion 12 held in contact with the outer peripheral face 11c in the radial direction. It is to be noted that in FIGS. 5 and 6A, the sealing lip region 18 is shown as held in a natural condition with no external force applied thereto, that is, in a condition in which the sealing member 5 is engaged in the seal mounting groove 2b, but the inner ring 1 has not yet been inserted inside the outer ring 2.

Each of the radially inner and outer sealing lips 18A and 18B is made up of a base portion 19, an intermediate portion 20 and that tip portion 21. Material for a segment of one of the radially inner and outer sealing lips 18A (18B) including at least the tip portion 21 is a highly frictionally wearable material of a kind which, when the bearing assembly is used for ten to some minutes, for example, 5 to 10 minutes, which is about equal to the break-in running tune, frictional wear takes place to establish a non-contact or a light contact in which the contact pressure can be regarded as zero. The highly frictionally wearable material referred to above may be provided only in the tip portion 21 of the sealing lip region 18 or in the tip and intermediate portions 21 and 20 or, alternatively, it may be provided in the entirety including the base portion 19, the intermediate portion 20 and the tip portion 21. This highly frictionally wearable material may be selected from specific variants thereof in consideration of the bearing use temperature and/or the affinity with a lubricant oil used. The highly frictionally wearable material may include, for example, a highly frictionally wearable rubber material. Although the example has been illustrated, in which as a material susceptible to frictional wear, which forms the highly frictionally wearable material for each of the sealing members 5, the highly frictionally wearable rubber material is used, a resinous material may be employed as another example of the material susceptible to frictional wear. Material forming the highly frictionally wearable material may be, other than that described above, a solid lubricating material, a non-woven fabric, a mild steel or the like.

FIG. 6A is a fragmentary enlarged sectional view showing each sealing lip region in contact with the seal groove in the inner ring and FIG. 6B is a fragmentary enlarged sectional view showing the tip of each sealing lip region which has been frictionally worn as a result of rotation of the bearing assembly. As best shown in FIG. 6A, the tip portion 21 of each sealing lip region 18 is so shaped and so configured as to have an outwardly converging shape of a greater rate of convergence than that of the intermediate portion 20 of the sealing lip region 18. The tip portion 21 of the radially inner sealing lip 18A is so positioned at a location adjacent a radially intermediate portion of the inner face 11a of the seal groove 11 as to confront it.

A seal mold assembly (hereinafter referred to as a mold for simplification) used to mold each of the sealing members 5 is made up of upper and lower mold members. With the upper and lower mold members mated together, a molding cavity is formed for formation of the respective sealing member 5, and a gate, through which material eventually forming the elastic member 13 is injected into this cavity, is provided in the mold.

Each of the sealing lips 18A and 18B, to which the highly wearable rubber material is applied, and the other portion of the elastic member 13 are molded by this mold by means of, for example, a two-color molding process. In other words, after the other portion of the elastic member 13, which forms a primary side, has been molded, the highly wearable rubber material is injected into the cavity for each sealing lip 18A or 18B, which forms a secondary side, to form the elastic member 12 of a unitary structure. In this way, the sealing lips 18A and 18B, which form the secondary side, are molded integrally with the other portion thereof within the same mold.

Since a portion of each of the sealing lips 18A and 18B including at least the corresponding tip portion 21 is made of such a frictionally wearable material as hereinabove described, each of the sealing members 5, which are of the contact type at the initial running stage, will become the sealing member of a non-contact type or a light contact type as a result of friction that takes place in a few hours subsequent to the start of the running. In other words, when the bearing assembly is used in a condition being rotated, the sealing members 8 cause respective tips of the sealing lips 18A and 18B, then contacting, to form minute labyrinth gaps $\delta 2$ and $\delta 3$. Since those labyrinth gaps $\delta 2$ and $\delta 3$ are smaller than the particle size of foreign matter, they can pass the lubricant oil therethrough, but cannot pass therethrough particulate matters of a size enough to adversely affect the bearing lifetime. For this reason, the seal torque can be reduced while an undesirable ingress of the foreign matter into the bearing assembly is avoided.

An experiments was conducted to compare the rotating torque the standard LH seal while the tip of each of the sealing lips 18A and 18B of each sealing member 5 had been worn out. For test conditions, the comparison was carried out at a radial load of 500 N, a rotational speed of 4,000 r/min. and a bearing temperature of 30° C. and a grease lubrication was employed. As a result, a torque reduction effect of about 97% relative to that exhibited by the standard LH seal has been ascertained.

The grease will now be described in detail.

The grease employable in the bearing assembly for a transmission according to this embodiment contains at least a base oil and a thickening agent, in which the base oil is a mineral oil alone or a mixed oil of mineral oil and poly-α-olefin (hereinafter, referred to "PAO") and is of a kind 100 mm$^2$ or lower in base oil kinetic viscosity at 40° C. For the mineral oil referred to above, an ordinary lubricant oil such as, for example, mineral oil of the paraffin system or mineral oil of the naphthenic system or any other oil used in the field where the grease is used can be employed. However, the use of the mineral oil of the naphthenic system such as, for example, cyclohexane or cyclopentane is preferred for the mineral oil because of an excellent low temperature characteristic thereof.

The PAO oil is generally a mixed oil of a polymer or oligomer of α-olefin or α-olefin which has been isomerized. Specific examples of the α-olefin include 1-okten, 1-nonene, 1-decene, 1-dodecen, 1-tridecene, 1-tetradecene, 1-pentadecene, 1-hexadecene, 1-heptadecene, 1-octadecene, 1-nonadecene, 1-eicosene, 1-docosene and 1-tetracosene, and a mixture of them can be employed. The mixing ratio of the mineral oil relative to the PAO oil (mineral oil/PAO oil) is preferably within the range of (100/0) to (20/80).

For the base oil, a mineral oil of the naphthenic system alone or a mixed oil of the mineral oil of the naphthenic system and the PAO oil can be suitably employed. The base oil that may be employed in the practice of the present invention is of a kind 100 mm²/s or lower, or preferably 10 to 75 mm²/s, in base oil kinetic viscosity at 40° C.

Figure 7:
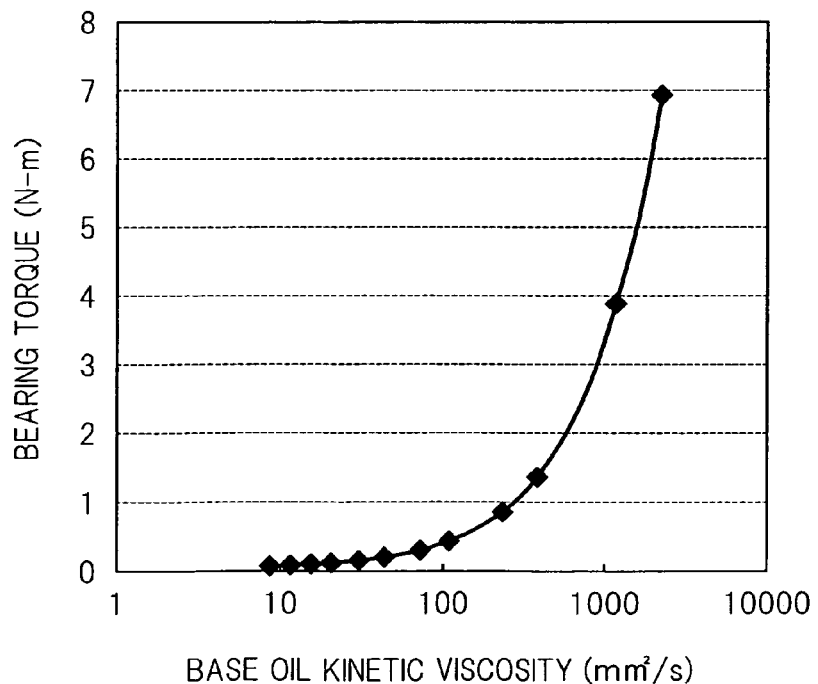
FIG. 7 is a diagram showing the relation between the base oil kinetic viscosity and the bearing torque.

A result of studies conducted to determine how the kinetic viscosity of the base oil used in the bearing assembly for a transmission affects the bearing torque is shown in FIG. 7, which illustrates the relationship between the base oil kinetic viscosity and the bearing torque. In FIG. 7, the base oil viscosity is plotted on the axis of abscissas in the form of logarithmic coordinates and the bearing torque is plotted on the axis of ordinates.

For the base oil, the mineral oil of the naphthenic system of a kind having the kinetic viscosity within the range of 10 to 2,000 mm²/s at 40° C. was employed. The grease was prepared by mixing the base oil in a quantity of within the range of 75 to 85 wt % with 15 to 25 wt % of an aromatic urea compound employed as a thickening agent.

With respect to the grease so prepared, if the base oil kinetic viscosity is lower than 100 mm²/s, the bearing torque is stabilized, but if the base oil kinetic viscosity exceeds 100 mm²/s, the bearing torque abruptly increased. In order to use within the bearing torque range in which the amount of change of the torque is so small as to permit it to be stable relative to the proportion of change of the kinetic viscosity, it is important that the base oil viscosity is not higher than 100 mm²/s. It is to be noted that if the kinetic viscosity is lower than 10 mm²/s, the base oil viscosity is too low to form an oil film.

For the thickening agent that may be used in the practice of the embodiment, examples thereof include, for example, benton, silica gel, fluorine compound, soaps such as lithium soap, lithium complex soap, calcium soap, calcium complex soap, aluminum soap and aluminum complex soap; and urea compounds such as, for example, diurea compounds and polyurea compounds.

Of them, the use of the urea compounds is preferred because of an excellent heat resistance and cost thereof.

The urea compound referred to above can be obtained by reacting an isocyanate compound with an amine compound. In order to avoid a reactive free radical being left, it is preferred that the isocyanate group of the isocyanate compound and the amino group of the amine compound be mixed together in substantially equivalent amount.

The diurea compound referred to above can be obtained by reacting, for example, diisocyanate with monoamine to react. Examples of the diisocyanate include, for example, phenylene diisocyanate, tolylene diisocyanate, diphenyl diisocyanate, diphenylmethane diisocyanate, octadecane diisocyanate, and decane diisocyanate, hexane diisocyanate.

Examples of the monoamine referred to above include, for example, octylamine, dodecylamine, hexadecylamine, stearin amine, oleylamine, aniline, p-toluidine, and cyclohexylamine.

The polyurea compound referred to above can be obtained by reacting, for example, diisocyanate with monoamine, diamine. For the diisocyanate and the monoamine, similar compounds to those used in preparation of the diurea compounds may be employed. Example of the diamine includes, for example, ethylenediamine, propanediamine, butanediamine, hexanediamine, octanediamine, phenylenediamine, tolylenediamine, xylene diamine and diamino diphenylmethane.

Of the urea compounds referred to above, the use is preferred of an aromatic diurea compound that can be obtained by reacting an aromatic diisocyanate such as, for example, phenylene diisocyanate, tolylene diisocyanate, diphenyl diisocyanate or diphenylmethane diisocyanate with an aromatic monoamine such as, for example, aniline or p-toluidine.

By blending the thickening agent of the urea system in the base oil, a base grease that is to be blended with various additives can be obtained. The base grease containing the compound of the urea system as a thickening agent can be prepared by reacting the isocyanate compound and the amine compound with each other in the base oil.

The proportion of the thickening agent blended in 100 parts by weight of the base grease is chosen to be within the range of 1 to 40 parts by weight and, preferably, within the range of 3 to 25 parts by weight. If the content of the thickening agent blended is less than 1 part by weight, an effect of the thickening agent is small enough to make it difficult to form the grease, and if the content of the thickening agent blended exceeds 40 parts by weight, the base grease eventually prepared will become hard and an intended effect cannot be obtained with no difficulty.

The grease employed in the practice of the embodiment may, if desired or required, have known types of additive for the grease added thereto. Examples of the additive referred to above include, for example, an antioxidant such as, for example, an organozinc compound or a compound of the amine system or the phenol system; a metal deactivator such as, for example, benzotriazole; a viscosity index improver such as, for example, polymethacrylate or polystyrene; a solid lubricating agent such as, for example, molybdenum disulfide or graphite; a rust inhibitor such as, for example, metal sulfonate or polyalcohol ester; a friction wear reducing agent such as, for example, organic molybdenum; an oily agent such as, for example, ester or alcohol; and a friction preventive agent such as, for example, a compound of the phosphorus system. Those additives referred to above may be employed singly or in a combination of two or more of them.

A comparative test was conducted to determine the rotating torque exhibited with the use of the grease of the embodiment, prepared in the manner discussed above, and that exhibited with the use of N6C grease which is generally selected for use in the transmission. For test conditions, the comparative test was carried out at a radial load of 500 N, a rotational speed of 4,000 r/min. and a bearing temperature of 30° C. and a grease lubrication was employed, and the test was performed after 1 hour break-in. As a result, a torque reduction effect of about 48% relative to that exhibited by the standard N6C grease has been ascertained.

While the rotating torque reduction rates exhibited by the retainer alone, each of the sealing members alone and the grease alone have been individually discussed hereinbefore together with the respective results of tests, a test was conducted using an assembly of the retainer, the sealing members and the grease to determine the rotating torque. For test conditions, the comparison was carried out at a radial load of 500 N, a rotational speed of 4,000 r/min. and a bearing temperature of 30° C. A result of this test is shown in the following Table 2 together with that exhibited by the conventional counterpart. In the grease lubricating condition, a developed product, which was the assembly of the retainer 4, the sealing members 5 and the grease, all pertaining to the present invention, has shown the 80% torque reducing effect as compared with the conventional counterpart.

TABLE 2

| Conventional Product | |
|---|---|
| Grease Lubrication | 0.366 N · m |
| Developed Product | |
| Grease Lubrication | 0.075 N · m |

From the foregoing description, in order to achieve a low torque feature with the assembled bearing, the various component parts, specifically the retainer, the sealing member and the grease, are preferably designed in consideration of independent low torque features and, hence, it has been confirmed from the various results of the tests conducted that when all of those component parts are assembled, the maximum torque reducing effect can be brought about.

According to the bearing assembly for a transmission, which has hereinbefore fully described, since the inner face of each of the pockets Pt in the retainer 4 is provided with the recessed portion 7, the torque can be sufficiently reduced. As the recessed portion 7 is provided in the inner face of each pocket Pt and a non-contact area, where no ball contacts, is provided in the retainer 4, the resistance at the time of flow of the lubricant within each pocket Pt can be reduced. Due to the provision of the recessed portion 7, the amount of the oil film formed between the ball and the respective pocket Pt can be minimized. If the non-contact area, in which the ball does not contact in the inner face of the respective pocket Pt, is too small, the amount of reduction of the amount of the oil film sheared becomes small and the amount of the oil film that leads to reduction in torque is too small and, therefore, a smooth rolling of the ball will be impaired. Accordingly, by setting the range of the surface area of contact of the ball in the associated pocket Pt such as accomplished in the present invention, the resistance at the time of flow of the lubricant within the pocket Pt and reduction of the amount of the oil film sheared can be accomplished concurrently.

Since the highly wearable material is chosen as a material for the tip portion of at least each of the seal lip region 18 of each of the sealing members 5, each sealing member 5, which was the contact type at the initial running stage, can become a sealing member 5 of the non-contact type or the light contact type. Accordingly, each sealing member 5 allows the tip portion of the seal lip region 18, which contacts, to wear to thereby form the minute labyrinth gaps 62 and 63. Since those gaps 62 and 63 are smaller than the particle size of the foreign matter, the lubricant can flow, but the foreign matter of a particle size large enough to affect the bearing lifetime cannot flow therethrough.

Further, since the grease applied to the bearing assembly for use in the transmission includes at least the base oil and the thickening agent and since the base oil used is a mineral oil alone or a mixture of the mineral oil and poly-α-olefin oil and the base oil kinetic viscosity at 40° C. is not higher than 100 mm$^2$/s, an undesirable ingress of the foreign matter such as, for example, burrs of a housing and/or worn scraps of gears can be avoided and a drag resistance of the sealing member can be suppressed down to a low value, allowing the low torque feature and the long lifetime to be accomplished concurrently.

Also, by the presence of the recessed portion 7 in the retainer 4, the surface area of contact between the inner face of each pocket Pt and the corresponding ball is reduced by a quantity equal to 15 to 30% of the standard contact surface area. Accordingly, by setting the lowermost limit of the contact surface area reduction ratio in the retainer 4 designed in accordance with this embodiment to 15%, the low torque effect can be obtained and, on the other hand, by setting the uppermost limit of the contact surface area reduction ratio in the retainer 4 to 30%, not only can the rigidity strength of the retainer be obtained, but also the ball can be retained. If this uppermost limit of the contact surface area reduction ratio exceeds 30%, the rigidity strength of the retainer can no longer be obtained and no ball can be retained any more.

Where as shown in FIG. 3A the recessed portions 7 are arranged on the bearing outer diametric side of the pitch circle PCD of the balls, the shearing resistance at the position at which the peripheral velocity is high can be reduced and the torque reduction can be stably achieved.

Since the retainer 4 employs a metal retainer molded by means of any known press work, as compared with the metal retainer molded by means of a cutting technique, not only can the tact time be reduced for manufacturing, but the manufacturing cost can also be reduced.

Hereinafter, a second embodiment will be described in detail. It is, however, to be noted that component parts employed in the second embodiment, which are similar to those shown and described in connection with the first embodiment, are designated by like reference numerals and, therefore, the details thereof are not reiterated for the sake of brevity. Where only a part of the construction is specifically described, the remaining part or parts of the construction are to be understood as similar to that or those shown and described in connection with the first embodiment. Also, not only a combination of the parts specifically shown and described in connection with any one of the foregoing and following embodiments of the present invention, but also a combination of respective parts of those embodiments can be readily available.

Figure 8A:
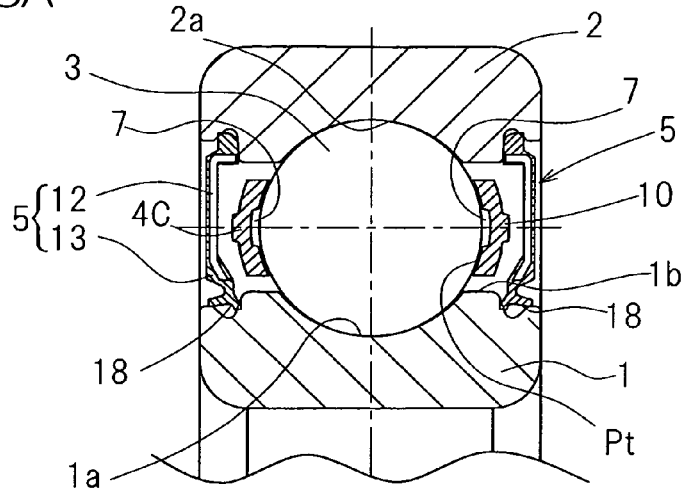
FIG. 8A is a sectional view showing the bearing assembly for a transmission designed in accordance with a second embodiment.
Figure 8B:
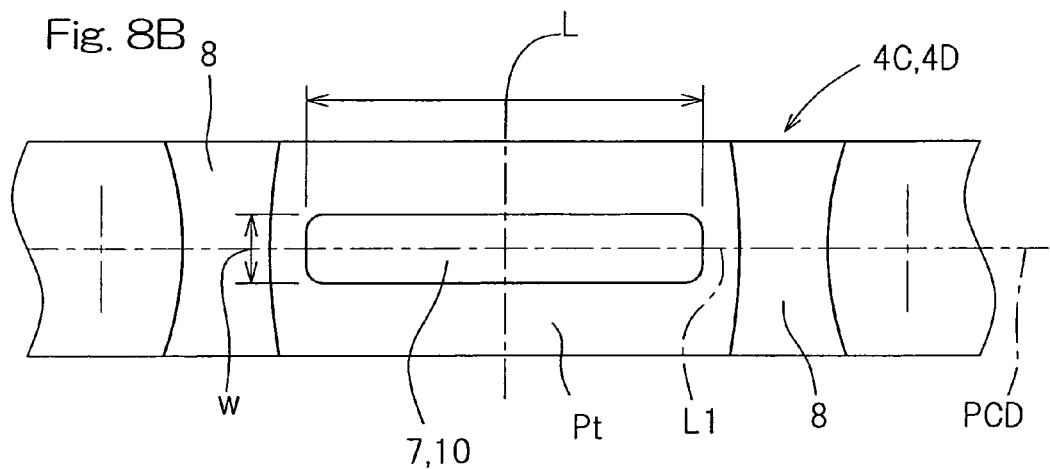
FIG. 8B is a front elevational view showing, on an enlarged scale, one of the ball bearing pockets in the ball retainer used in the bearing assembly for a transmission shown in FIG. 8A.
Figure 8C:
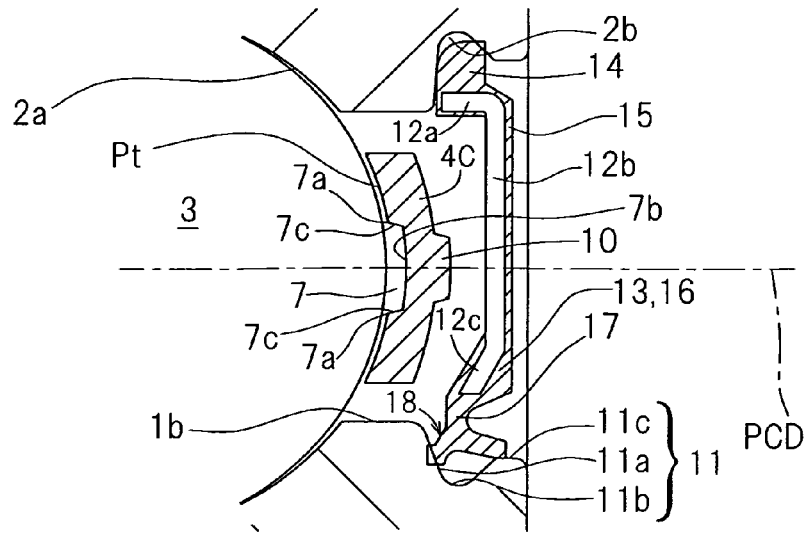
FIG. 8C is an enlarged view showing an important portion of the bearing assembly shown in FIG. 8A.

In the retainer 4C employed in the bearing assembly for a transmission shown in FIG. 8A, the center line L1 of the projection 10 is made to match with the pitch circle PCD of the balls as best shown in FIGS. 8A and 8B. Even in this retainer 4C, the surface area of contact of the ball in the pocket Pt is reduced by a quantity equal to 15 to 30% of the surface area of contact with the ball when no projection 7 is employed. As shown in FIG. 8C, the projection 7 is formed with inclined faces 7c and 7c each having a width which is narrowed, when viewed in a section thereof, from a corresponding open edge 7a and 7a towards a bottom face 7b of such projection 7.

Due to those inclined faces 7c and 7c, not only can the surface area of contact of the ball in the pocket Pt be reduced to a value within the specified range referred to above, but also the rigidity of the retainer 4A can be secured. Also, because of the provision of the inclined faces 7c and 7c, the annular retainer strips 4A and 4B (best shown in FIG. 2) can be easily separated from the mold during the press work. It is to be noted that the projection 10 may be of such a rectangular shape that the circumferential dimension thereof, when viewed in a direction axially of the bearing assembly, is longer than the radial dimension thereof or, conversely, the radial dimension thereof is longer than the circumferential dimension thereof. Alternatively, the projection 10 may be of such a square shape that the circumferential dimension thereof and the radial dimension thereof are equal to each other. Yet, the projection 10 may not be always limited to the rectangular shape, but may be oval, elliptical or round. In addition, the outer surface of each of the semicircular bulged portions 6 may be provided with a plurality of projections 10 to secure the intended contact surface area.

Figure 9:
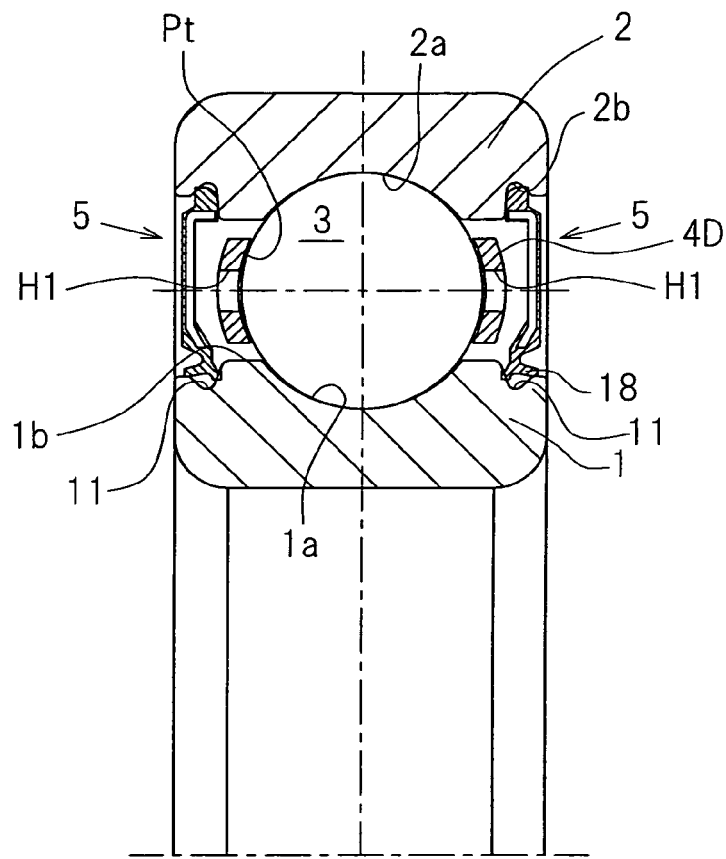
FIG. 9 is a sectional view showing the bearing assembly for a transmission designed in accordance with a third embodiment.

In the bearing assembly for a transmission designed in accordance with a third embodiment, as shown in FIG. 9, each of the pockets Pt in the retainer 4D is provided with a throughhole H1 defined therein so as to extend from a retainer inner diametric side to a retainer outer diametric side, which throughhole H1 forms a recessed portion in the respective pocket Pt. The throughhole H1 represents a rectangular shape as shown in FIG. 8B, when viewed in the direction axially of the bearing assembly and the center line L1 thereof matches with the pitch circle PCD of the balls. It is, however, to be noted that the shape of the throughhole H1 may not necessarily be limited to the rectangular shape as shown and described and, also, the center line L1 of the throughhole H1 may not necessarily match with the pitch circle PCD.

When the retainer 4D provided with the throughhole H1 has been provided is applied, unlike the retainer provided with the projection, the dimension of the retainer in the axial direction of the bearing assembly does not increase and compactization thereof can be attained. In other words, while securing the dimension comparable with the standard retainer, the torque reduction can be attained. With the retainer 4D compactized in the axial direction, interference with, for example, the sealing members 5 in the bearing assembly can be easily avoided. Thus, the degree of freedom of design of the ball bearing assembly for a transmission can be increased. Also, using the mold for the standard retainer with no recessed portion employed, the throughhole H1 can be formed during the post processing. Not only can the equipment cost be reduced in view of the capability of the mold concurrently used, the position, size and shape of the throughhole H1 can be simply modified as required or desired. It is to be noted that there is the opportunity that the mold is not used concurrently.

The retainer may not be necessarily limited to a press worked product, but may be a molded product by means of a casting technique. Also, the retainer may be formed by means of a shaping process or an electric discharge machining including a wire cutting.

For the retainer, it may not be necessarily limited to a metal retainer made of metal, but may be a resin retainer made of a resinous material. For the resinous material, a polyphenylene sulfide resin or a polyamide 46, for example, may be used. By way of example, where a long term heat resistance to 200° C. or higher is required, a material such as, for example, a polyimide resin, a polyamide-imide resin or a polyether ether ketone resin can be employed. The resin retainer can be molded by means of, for example, an injection molding technique. Other than it, the resin retainer may be molded by means of the shaping process.

Figure 10:
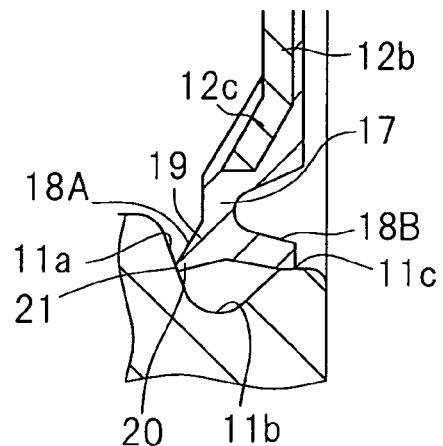
FIG. 10 is a sectional view showing a modification of the sealing member employed in the bearing assembly for a transmission designed in accordance with any one of the first to third embodiments.

As shown in FIG. 10, where the sectional shape of the tip portion 21 of the sealing lip 18A is so shaped as to represent an outwardly converging shape having a greater rate of convergence than that of the intermediate portion 20 of the sealing lip 18A, it is possible to facilitate a quick and assured wearing of the tip portion 21 of the sealing lip 18A.

Figure 11A:
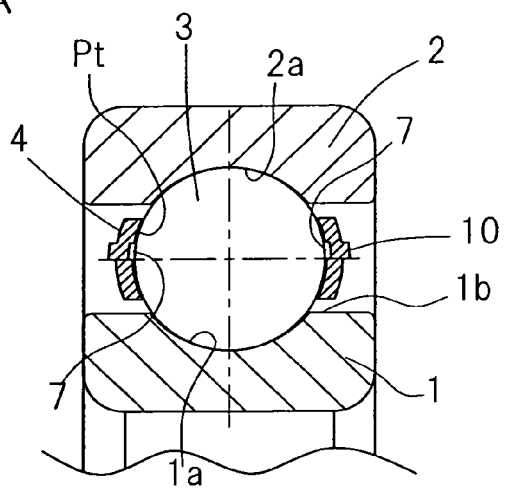
FIG. 11A is a sectional view showing the bearing assembly for the transmission designed according to one applied mode.
Figure 11B:
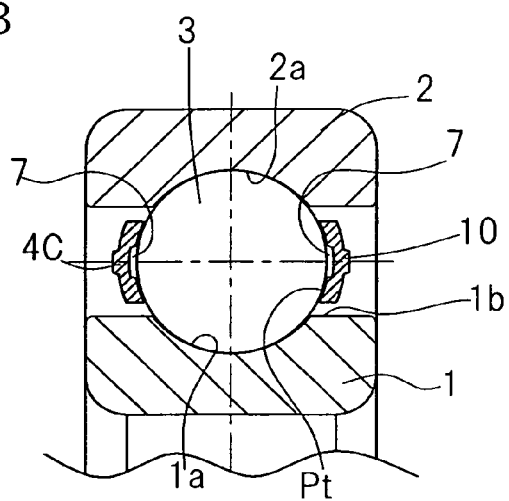
FIG. 11B is a sectional view showing the bearing assembly for the transmission designed according to one applied mode.
Figure 11C:
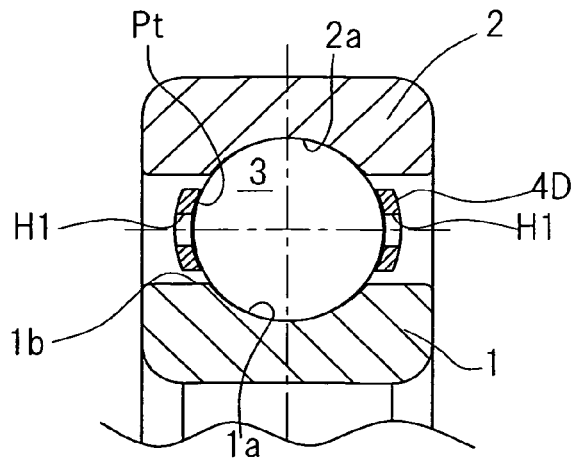
FIG. 11C is a sectional view showing the bearing assembly for the transmission designed according to one applied mode.

FIGS. 11A, 11B and 11C illustrates an applied mode of the present invention, pertaining to a so-called open type bearing assembly, which is a version of the bearing assembly for a transmission shown in and described with particular reference to FIG. 1, FIGS. 8A to 8C and FIG. 9, from which the sealing members 5 are dispensed with. Even in this type of bearing assembly, the surface area of contact of the ball in the pocket Pt in the retainer can be reduced by a quantity equal to 15 to 30% of the standard contact surface area and, therefore, not only can an effect of reduce the torque and the rigidity strength of the retainer be obtained, but also the ball can be retained.

Figure 12:
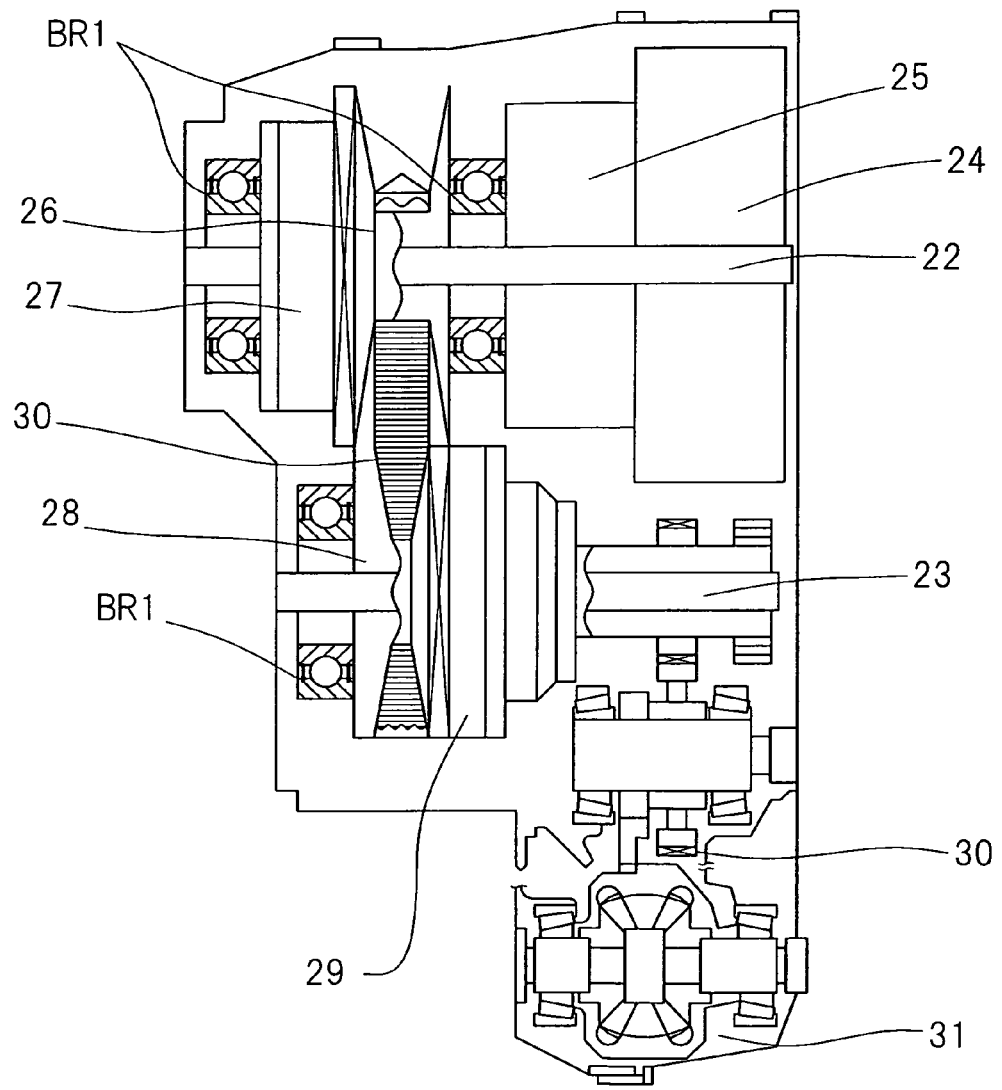
FIG. 12 is a diagram showing an example, in which the bearing assembly for a transmission designed in accordance with any one of the embodiments is applied in a continuously variable transmission.

FIG. 12 illustrates a longitudinal sectional view showing one example in which the bearing assembly for a transmission is applied to a continuously variable transmission. The bearing assembly BR1 for the transmission is used to transmit the rotation of an input 22 to a rotation of an output shaft 23 after the former has been speed changed in a stepless fashion.

Referring now to FIG. 12, the input shaft 22 is rotationally driven by a drive source such as, for example, an engine through a torque converter 24 and a planetary gear mechanism 25. A drive side pulley 26 rotatable in unison with the input shaft 22 is provided on the input shaft 22, and the groove width of this drive side pulley 26 is controlled by a drive side actuator 27 so as to expand or reduce. A driven side pulley 28 rotatable in unison with the output shaft 23 is provided on the output shaft 23, and the groove width of this driven side pulley 28 is controlled so as to expand or reduce by a driven side actuator 29.

The driven side pulley 28 and the drive side pulley 26 are rotated through an endless belt 30, trained between respective portions of diameters associated with the selected groove widths, at respective speeds corresponding to such diameters, a driving power transmitted to the input shaft 22 is transmitted to the driven pulley 28 from the drive side pulley 26 through the endless bent 30. The driving power so transmitted to the driven side pulley 28 is then transmitted to a drive wheel from the output shaft 23 through a reduction gear train 30 and a differential 31. As the bearing assembly BR1 for the transmission for rotatably supporting each of the input shaft 22 and the output shaft 23, a deep groove ball bearing is used.

In order to increase the speed of the output shaft 23 relative to the input shaft 22, the groove width of the drive side pulley 26 is reduced and, on the other hand, the groove width of the driven side pulley 28 is expanded, so that the respective diameters of those portions, around which the endless belt 30 is trained, become large on the part of the drive side pulley 26 and small on the part of the driven side pulley 28, and, accordingly, the speed of the output shaft 23 is increased relative to the input shaft 22.

On the other hand, where the speed of the output shaft 23 is desired to be reduced relative to the input shaft 22, the groove width of the driven side pulley 26 is increased and the groove width of the driven side pulley 28 is reduced, so that the respective diameters of those portions, around which the endless belt 30 is trained, becomes small on the part of the driven side pulley 26 and large on the part of the driven side pulley 28, and, accordingly, the speed of the output shaft 23 can be reduced relative to the input shaft 22.

According to the foregoing construction, an undesirable ingress of the foreign matter such as, for example, frictionally worn particulates of gears within the transmission into the bearing assembly can be avoided. Since the seal torque can be reduced, it is possible to increase the mileage of the automobile.

The applied mode, which does not require the use of the sealing members of the present invention, includes the following various modes.

[Mode 1]

The retainer according to the mode 1 is a retainer that is incorporated in a ball bearing assembly for a transmission, which is arranged in the transmission for transmitting a rotation of an input shaft to a rotation of the output shaft, which retainer includes a pocket for retaining a ball, defined by opposed semispherical bulged portions, and a recessed portion provided in an inner face of the pocket so as to extend from a retainer inner diametric side towards a retainer outer diametric side, whereby assuming that the surface area of contact between the inner face of a retainer with no recessed portion provided therein and a ball is a standard contact surface area, the surface area of contact between the pocket and the ball is reduced by a quantity equal to 15 to 30% of the standard contact surface area.

According to the above described construction, the provision of the recessed portion in the inner face of the pocket is effective to reduce the resistance at the time the lubricant flows within the pocket. The provision of the recessed portion referred to above is effective to reduce the amount of the foil film, formed between the ball and the pocket, to a value smaller than the amount of the oil film in the retainer having no recessed portion formed therein. Selection of the lowermost limit of 15% for the surface area of contact between the inner face of the pocket in the retainer and the ball is effective to secure a low torque effect. On the other hand, selection of the uppermost limit of 30% for the surface area of contact between the inner face of the pocket in the retainer and the ball is effective to secure the rigidity strength of the retainer and, at the same time, to reduce the amount of the oil film being sheared.

If the non-contact area, where in the pocket inner face no ball contacts, is too small, the amount of the oil film reduced is small and the amount of the oil film with which the torque is reduces becomes too small enough to impair a smooth rolling of the ball. With the surface area of contact between the pocket and the ball having been so set to fall within the above specified range, the resistance at the time of flow of the lubricant within the pocket and reduction of the amount of the oil film being sheared can be accomplished concurrently.

[Mode 2]

The recessed portion referred to above may be arranged on a bearing outer diametric side of the pitch circle of the ball. In this case, the shearing resistance at a position at which the peripheral velocity is high can be reduced. Accordingly, the torque can be further stably reduced.

[Mode 3]

The pocket in the retainer may be provided with a throughhole extending completely from a retainer inner diametric side to a retainer outer diametric side, in which case this throughhole is rendered to be the recessed portion in the pocket. In this case, the dimension of the retainer in the axial direction of the bearing assembly will not become large and can be reduced in the axial direction. In other words, the torque reduction can be accomplished while the same dimension as that of the standard retainer is maintained. With the retainer compactized in the axial direction, interference with the sealing member in the ball bearing assembly, for example, can be avoided easily. In this way, the degree of freedom of design choice of the ball bearing assembly for a transmission can be enhanced. Also, the throughhole can be formed by means of a post processing with the use of a mold assembly for the retainer having no recessed portion. As the mold assembly can be concurrently used, the cost of equipments can be reduced and the position, size and shape of the throughhole can be easily changed as desired or required. It is to be noted that it may occur that the mold assembly may not be used concurrently.

[Mode 4]

In any one of the modes 1 to 3, the retainer may be a metal retainer shaped by means of a press work. In such case, as compared with a metal retainer molded by means of a cutting process, the tact time can be reduced and mass-production can be easily accomplished. Accordingly, the cost of manufacture per unitary number of the retainers can be reduced.

[Mode 5]

In any one of the modes 1 to 3 described above, the retainer may be a metal retainer shaped by a casting process.

[Mode 6]

In any one of the modes 1 to 3 described above, the retainer may be a metal retainer molded by a cutting process. In this case, the recessed portion can be more accurately processed and the dimensional accuracy can be increased as compared with the retainer or the like shaped by means of, for example, a press work.

[Mode 7]

In any one of the modes 1 to 3 described above, the retainer may be a resin retainer molded by means of a cutting process. In such case, the relative gravity can be reduced as compared with that of a metal product and, therefore, the retainer in its entirety can have a reduced weight, which leads to reduction in weight of the bearing assembly.

[Mode 8]

The bearing assembly for a transmission according to the mode 8 described above is the one provided with the retainer according to any one of the modes 1 to 7 described above. In such case, the bearing assembly for a transmission of a type, in which the resistance at the time of flow of the lubricant within the pocket and the reduction of the amount of the oil film being sheared can be both accomplished concurrently, can be obtained.

Although in describing any one of the preferred embodiments and any one of the applied modes the bearing assembly including the retainer, the sealing member and the grease has been shown and described as used in the continuously variable transmission, the bearing assembly so shown and so described can be equally applied in a manually operated transmission and an automatic transmission.

Where the bearing assembly for the transmission is of an outer ring rotating type, the sealing member has to be fixedly engaged in an outer peripheral surface of the inner ring and the sealing lip region referred to previously has to be brought into contact with an outer ring seal groove for wearing.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Inner ring
2 . . . Outer ring
1a, 2a . . . Raceway
3 . . . Rolling element
4 . . . Retainer
5 . . . Sealing member 6 ... Semicircular bulged portion
7 ... Recessed portion
18 ... Seal lip region
20 ... Intermediate portion
21 ... Tip portion
H1 ... Throughhole
Pt ... Pocket

What is claimed is:

1. A bearing assembly for a transmission that is arranged in the transmission for transmitting a rotation of an input shaft to an output shaft, comprising
    a plurality of balls interposed between first and second raceways defined respectively in first and second raceway rings,
    a retainer for retaining the balls, and
    a sealing member for sealing a bearing space delimited between the first and second raceway rings with a grease filled in the bearing space;
    wherein the retainer is formed with a plurality of pockets for retaining the respective balls, each of the pockets being defined by semicircular bulged portions opposed to each other and has an inner face formed with a recessed portion extending from a retainer inner diametric side to a retainer outer diametric side;
    wherein the sealing member is in the form of a contact seal including first and second end portions opposite to each other, the first end portion of the sealing member being fixed to one of the first and second raceway rings whereas the second end portion has a sealing lip region that is adapted to contact the other of the first and second raceway rings before start of running of the bearing assembly, a material for at least a tip portion of the sealing lip region being a frictionally wearable material which wears, when the bearing assembly is used in a rotating condition, to form a non-contact or a contact of a contact pressure substantially equal to zero to thereby form a labyrinth gap between the tip portion of the sealing region and the other of the first and second raceway rings having a size that allows a lubricant oil to pass through the gap and prevents particulate matters from passing the gap, and
    wherein the grease contains at least a base oil and a thickening agent, the base oil being a mineral oil alone or a mixed oil of mineral oil and poly-a-olefin oil and has a base oil kinetic viscosity at 40° C., which is not higher than 100 mm2/s.

2. The bearing assembly for a transmission as claimed in claim 1, wherein defining a surface area of contact between an inner face of each pocket of the retainer, with no recessed portion defined therein, and the corresponding ball as a standard contact surface area, the surface area of contact between the inner face of the respective pocket of the retainer and the ball is reduced by a quantity equal to 15 to 30% of the standard contact surface area.

3. The bearing assembly for a transmission as claimed in claim 1, wherein the recessed portion of the retainer is arranged on a bearing outer diametric side of a pitch circle depicted by the balls.

4. The bearing assembly for a transmission as claimed in claim 1, wherein the pocket of the retainer has a throughhole defined therein so as to extend from the retainer inner diametric side to the retainer outer diametric side, the throughhole defining the recessed portion in the respective pocket.

5. The bearing assembly for a transmission as claimed in claim 1, wherein the retainer has incorporated therein a metal retainer formed by means of a press work.

6. The bearing assembly for a transmission as claimed in claim 1, wherein the retainer has incorporated therein a metal retainer formed by means of a casting technique.

7. The bearing assembly for a transmission as claimed in claim 1, wherein the retainer has incorporated therein a metal retainer formed by means of a cutting technique.

8. The bearing assembly for a transmission as claimed in claim 1, wherein the retainer has incorporated therein a resin retainer formed by means of a cutting technique.

9. The bearing assembly for a transmission as claimed in claim 1, wherein the retainer has incorporated therein a resin retainer formed by means of an injection molding technique.

10. The bearing assembly for a transmission as claimed in claim 1, wherein the tip portion of the sealing lip region has such a sectional shape as to represent an outwardly converging shape having a greater rate of convergence than that of an intermediate portion of the sealing lip region.

11. The bearing assembly for a transmission as claimed in claim 1, which is a rolling bearing for use on a drive shaft of a gearing device of an automobile transmission.

* * * * *

UNITED STATES PATENT AND TRADEMARK OFFICE
CERTIFICATE OF CORRECTION

PATENT NO. : 8,714,827 B2
APPLICATION NO. : 13/138954
DATED : May 6, 2014
INVENTOR(S) : Ishikawa et al.

Page 1 of 1

It is certified that error appears in the above-identified patent and that said Letters Patent is hereby corrected as shown below:

In the Claims

Column 20, Line 1, in Claim 1, delete "poly-a-olefin" and insert -- poly-α-olefin --, therefor.
Column 20, Line 3, in Claim 1, delete "mm2/s." and insert -- mm$^2$/s. --, therefor.

Signed and Sealed this
Nineteenth Day of August, 2014

Michelle K. Lee
*Deputy Director of the United States Patent and Trademark Office*